Oct. 1, 1963  J. D. GROVES  3,105,736
REACTOR FEED METHOD
Filed April 15, 1960
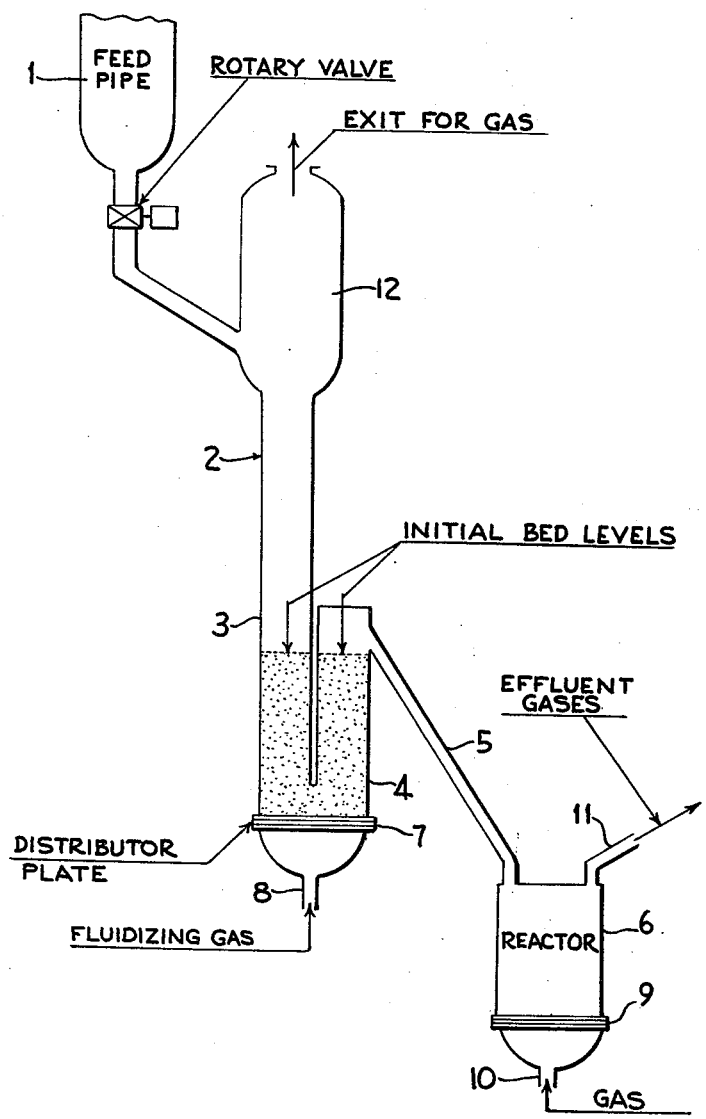
INVENTOR.
JAMES DENNIS GROVES
BY
Oscar L. Spencer
ATTORNEY United States Patent Office 3,105,736
Patented Oct. 1, 1963

3,105,736
REACTOR FEED METHOD
James Dennis Groves, Fairfield, Stockton-on-Tees, England, assignor to British Titan Products Company Limited, Billingham, Durham, England, a company of Great Britain
Filed Apr. 15, 1960, Ser. No. 22,643
5 Claims. (Cl. 23—87)

This invention is an improved method of feeding disintegrated or particulate solid material into a reactor producing effluent gases whereby the latter are prevented from penetrating the feeding system. The term "gas" used herein is to be understood as including vapor.

The invention, although not restricted thereto, is particularly useful in connection with the preparation of metal halides, e.g., titanium tetrachloride, where a particulate solid reactant comprising a metal ore, e.g., a titaniferous ore such as rutile, and a carbonaceous substance, such as coke, is fed into a reactor to be reacted with a halogenating gas at a high temperature. In this case the reactor is preferably operated by introducing the halogenating gas upwardly through a bed of the solid reactant so as to maintain it in a fluidized or dynamic state. Effluent gases emanating from the reactor contain the metal halide which may be subsequently condensed and recovered in the liquid or solid state. In order to effect a continuous operation, the bed is continuously or periodically replenished with fresh solid reactant. It will be appreciated that it is important to feed the solid reactant into the reactor in such a way as to prevent escape of the halide vapors into the feeding system. It may also be desirable, although not always essential, to remove from the solid reactant being fed to the reactor extraneous gases, such as air, which are naturally entrained therewith.

The method of the invention is characterized by supplying the particulate solid material through a conduit comprising a downward leg followed by an upward leg having an outlet leading to the reactor, and forcing a gas into a mass of the material collected in these legs so as to fluidize and mobilize this mass and therewith to form a seal against back flow of effluent gases from the reactor.

It will be understood that the method is applicable to the feeding of solid material in particles of any size or sizes such that a mass of the same is gas-fluidizable and that, in the case of mixtures of different materials, there will not be undesirable segregation of the component materials.

During the supply of the solid material into the conduit the level of the bed of the mass in the downward leg will normally be higher than the level of the bed of the mass in the upward leg, thus providing a pressure head causing travel of the mass through the legs and overflow of the material in the upward leg through the outlet thereof to the reactor.

The back pressure created by the effluent gases emanating from the reactor, and seeking to exit through the feeder system, may not always be constant, since an occasional "blow back" may occur, i.e. a spasmodic sharp increase of back pressure.

A generally constant back pressure is overcome by the pressure head and by the maintenance of a steady flow of the fluidizing gas producing the desired rate of solid material flow at its most practical fluidized state. The pressure of the fluidizing gas in the bed of material in the upward leg, which is in direct communication with the reactor, will necessarily be above the back pressure from the reactor in order that the bed in the upward leg will be fluidized. Some of the fluidizing gas will therefore flow through the outlet of the upward leg. This ensures the effectiveness of the fluid seal against penetration by the gaseous effluent from the reactor into the feeder system.

Preferably the solid material is supplied into the feed conduit below an upper portion thereof which is enlarged in cross section and which has an outlet for fluidizing gas and any matter entrained therein, so that the supply will not be interrupted by reason of any spasmodic high back pressures from the reactor.

The fluidizing gas may be air but if it be desired to avoid the introduction of air with the feed into the reactor the fluidizing gas may be a relatively inert gas, e.g. nitrogen, which will purge the material being fed of the air which is naturally entrained therewith. The material may be purged of entrained moisture or damp air by the use of any dry fluidizing gas.

According to an embodiment of the discovered method of feeding particulate material into a reactor producing effluent gases, therefore, a pair of fluidized beds of the particulate solid material in an upwardly rising stream of gas are established. The beds have separate levels. These levels or surfaces may be characterized as the interface or boundary between the dense solid phase of the beds themselves and the non-dense or gaseous phases which exist above the beds.

The beds communicate below their levels so that the particles of the beds flow readily back and forth between the beds when they are in a fluidized state. The levels of the beds are such that the pressure in the second bed is ordinarily above that within the reactor, so that the effluent gases do not penetrate the feed system.

Particulate material is fed to the first bed from a point above its level. The head in the first bed therefore becomes greater than that in the second bed, causing the particulate material to flow into the second bed and thence into the reactor from the second bed through the means of communication between the first and second beds.

Preferably, the level of the second bed is in communication with the reactor. When periodic back pressure or surging occurs in the reactor, this is transmitted to the level of the second bed. Such increase in pressure causes the solid particulate material to flow from the second bed to the first bed. The level of the first bed rises, thereby increasing the pressure in the second bed and at the level of the second bed. This increased pressure in the second bed counteracts the pressure surge or pulse in the reactor and prevents the effluent gases from penetrating the feed system or escaping through the feed system. Because the point from which the particulate material is fed into the first bed is above the level of the first bed, it should be noted, this method of feeding compensates for the periodic back pressure in the reactor without interrupting the feed to the first bed.

In carrying out the process, the first and second beds may be conveniently established in the legs of a U-tube.

There will now be described in more detail with reference to the accompanying diagrammatic flow-sheet drawing an application of the method of the invention to the feeding of a mixture of a metal ore and a carbonaceous substance to a chlorination reactor.

In the drawing 1 indicates a feed pipe for the particulate material communicating through a rotary valve with a feeder conduit 2. The latter comprises a downward leg 3 followed by an upward leg 4 from which an outlet conduit 5 leads to a reactor 6. Legs 3 and 4 communicate at their lower ends to form a U-shaped feed collector. Mounted across the bottom of this collector is a gas distributor plate 7, below which is an opening 8 for the admission of fluidizing gas.

Reactor 6 (which may be any convenient size and may be substantially larger with respect to the feeder than is indicated in the drawing) has a gas distributor 9 at the base thereof in communication with an opening 10 through which chlorinating gas is admitted into the reactor. Effluent gaseous reaction products generated in the reactor 6 are removed therefrom through exit 11.

In operation, a metal-bearing ore, such as rutile, blended with a carbonaceous material, such as coke, is supplied from feed pipe 1 through the rotary valve into the conduit 2. The material forms beds in legs 3 and 4 which initially are at, say, the levels shown, the bed level of leg 3 being the same as that of leg 4. In operation, these beds are fluidized or rendered dynamic by the introduction, at a controlled rate, of a fluidizing gas which may be an inert gas, such as nitrogen, through the opening 8 and upwardly through the distributor plate 7, said rate being sufficient to cause particles of material to be suspended in the beds in legs 3 and 4, whereby the beds are, in effect, fluidized and mobilized. It will be understood that fluidizing would normally be used during the initial charging of material into the conduit in order to produce the beds at the levels shown.

Roughly one-half of the gas introduced upwardly through the distributor plate 7 flows through the bed in leg 3 and thus purges the feed; for example, if an inert gas is used, any air or oxygen entrapped in the feed is carried up and away. This gas then exits from the conduit 2 at the top thereof as indicated. The remaining portion of gas introduced through the distributor plate 7 passes upwardly through the leg 4, fluidizing the bed contained therein, and thence passes into the conduit 5 which leads to the reactor 6.

In operation, therefore, a continuous flow of material to reactor 6 is maintained by introducing a coke-ore mixture into the conduit 2 at such a rate that the bed level in leg 3 exceeds that in leg 4 and, by the pressure head so created, a stream of feed is made to travel through the feeding device into reactor 6.

Obviously, the amount of material fed into the leg 3 may be proportionate to the amount discharged from the leg 4 into the reactor 6 to effect a continuous system.

The reactor 6 contains a bed of the ore-coke mixture which is fluidized by the action of chlorine gas entering upwardly through the opening 10 and the distributor 9. Gaseous products containing $TiCl_4$ (assuming the ore to be titaniferous) which result from the reaction of the ore, coke and chlorine mixture at temperatures between 600 and 1200° C. in the reactor 6 are taken off through the exit 11 for condensation and purification. Obviously, the gaseous reaction products produced in the reactor 6 will seek any exit and make their way up through the conduit 5 into the feeder unless enough countering pressure is maintained by means of the solid-gaseous mixture flowing through the conduit 5 toward the reactor to overcome the back pressure created by the gaseous reaction mixture. Hence, the gas pressure in the leg 4 is above that in the reactor at the exit end of the conduit 5 whereby a very effective sealing is maintained.

It will be noted that the conduit 2 has an upper extension 12 of enlarged cross section, the purpose being to limit entrainment of fines (solids) by gases passing therethrough, particularly any occasional blow back streams.

The following is an example showing one way of performing the method of the invention.

*Example*

A mixture containing 80% by weight rutile ore (96–98% $TiO_2$ by weight) and 20% by weight coke is supplied into the feed conduit 2 until the static bed levels shown in the drawing are realized. These beds constitute a 200 pound hold-up of the mixture and individual static bed heights of 55 inches in each leg, the diameter of each leg being 6 inches. The rutile and coke mixture has the following screen analysis:

| Rutile (Percent by Weight Left on Screen) | Tyler Screen Mesh | Coke (Percent by Weight Left on Screen) |
|---|---|---|
| 0 | 35 | 4.0 |
| 0 | 48 | 6.5 |
| 1.7 | 65 | 16.2 |
| 26.2 | 100 | 35.2 |
| 64.5 | 150 | 24.4 |
| 7.6 | 200 | 10.0 |
|  | Remainder | 4.0 |

The beds are fluidized by passing nitrogen (for example) upwardly therethrough at a rate of about 3 cubic feet per minute, the nitrogen being introduced through the opening 8 and the distributor plate 7. The pressure drop across the distributor plate during fluidization is 3.75 pounds per square inch gauge.

Coke-rutile mixture is now supplied into the conduit 2 from the feed pipe 1 in the amount of 3000 pounds per hour. The rate of feed of the mixture is such that a pressure head is created and maintained in leg 3 by keeping the bed level therein about 3 inches above the level in leg 4. This suffices to cope with a back pressure of about 0.25 pound per square inch (measured at the reactor) occurring as a result of effluent gases from the reactor seeking to exit through conduit 5 and the conduit 2. However, since it may be desired to cope with constant back pressures higher than 0.25 pound per square inch the leg 3 extends a considerable distance from the bed level shown to the point where feed material enters it. If this distance is, say, 73 inches, a constant back pressure as high as 6 pounds per square inch can be coped with without interruption of feed because the bed level in leg 3 could be brought to as much as 73 inches above the level of 55 inches in leg 4. Alternatively, looking at it from the point of view of working against a lower constant back pressure but of there occurring a temporary strong back surge of pressure such as to depress the bed level in leg 4 to near the bottom thereof so as to interrupt the feed, there would be available for use a counteracting pressure head of up to about 120 inches of fluidized mass in leg 3 which would be equivalent to about 10 pounds per square inch. Apart from this there is also the extension 12 of the conduit 2 at its upper end which provides further accommodation in the event of very strong back surges of pressure occurring.

By the action of the fluidizing gas, solid particles passing through the leg 3 are purged of any undesirable contaminants. The fluidizing gas and such contaminants exit from the top of the conduit 2, as shown in the drawing. The purged particles pass from leg 3 to leg 4 and then into the reactor 6. Since the gas pressure in the upper portion of leg 4 is above that in the reactor, fluidizing gas from leg 4 flows through conduit 5 into the reactor and exits with the chlorination gases above the level of the bed of chlorination therein.

Once in reactor 6, of course, the ore-coke mixture is subjected to temperatures between 600 and 1200° C. and to steady upward flow therethrough of chlorine gas to effect chlorination of the titanium constituent and thus produce $TiCl_4$. The conditions of chlorination (rates of chlorine introduction etc.) may be conveniently maintained at the appropriate level, for example, in accordance with British Patent No. 724,193 or No. 762,583, published February 16, 1955, and November 28, 1956, respectively.

While the method of the invention is particularly applicable to fluidized reactors, it is also readily adaptable to furnace-type and other reactors where it is imperative that the feeding system be effectively sealed from the effluent gases emanating from the reactor.

While a certain specific concentration of ore-coke mixture has been indicated above it will be appreciated that, depending upon the grade and type of ore, the concentration may be varied. Other types of ore which may be fed by the method of the invention are other titanium ores, such as ilmenite, zirconium ores, chromium ores, tin ores, iron ores, and the like. In general, metals which form halides volatile at temperatures up to 1200° C. may be used.

It will also be understood that not only the purity and kind of feed may differ, but the individual particle sizes may also vary significantly.

One of the advantageous features of the method of the invention is its flexibility and adaptability to the needs of the operator. For instance, where excessive "blow back" or high back pressures are to be coped with as a result of the nature of the reaction taking place, the leg 3 could be extended to any desired length. The fluidization rate may also be increased or decreased to suit operational needs.

Although nitrogen has been mentioned as a fluidizing gas in the example, other normally non-reactive gases, such as $CO_2$, $CO$, a mixture of $CO_2$ and $CO$, such as is derived (after removal of chlorides) from the rutile chlorination process mentioned above, argon, or helium, may be used. However, more reactive gases such as chlorine, HCl or the like may be used where proper methods are used to recover such gases. Moreover, dry air may be used for fluidizing a titaniferous ore-coke mixture being fed to a chlorination reactor. The feeding of the solid reactant, while generally continuous, can be made intermittent by simply providing a means, such as a valve, between the reactor and the feeding system, e.g. in conduit 5, for sealing off the feeding system. Thus, for example, the feeder can be disassembled or shut down briefly for maintenance purposes without seriously interrupting the reaction taking place in the reactor.

The method of the invention is applicable to chlorination processes using other than chlorine gas. For example, it is applicable to processes using $COCl_2$, HCl, and the like, as the chlorinating gas.

Although the drawing shows the conduit 5 leading to the top of the reactor so that the feed material is introduced into the reactor 6 at a point above the bed level therein, this may be modified so that the feed is introduced below the bed level, e.g. at a point close to the chlorine distributor 9. In this case, fines in the feed would be subjected to a high chlorine concentration and reacted immediately. Thus, the concentration of fines swept out by the effluent gases from the reactor would be limited.

It will be understood that apparatus designed for carrying out the method hereinbefore described is comprised in the invention.

This application is a continuation-in-part of United States application Serial Number 629,563, filed December 20, 1956, now forfeited.

What is claimed is:
1. In the chlorination of metal bearing materials in a bed in a zone of chlorination, the improvement which comprises establishing a pair of fluidized beds of pulverulent material to be chlorinated suspended in an upwardly flowing stream of gas which is inert to the material, said beds having separate upper levels and being in communication below the upper levels, the upper level of the first of said beds forming a surface bounded on one side by the fluidized bed and on the other side by inert fluidizing gas, the upper level of the second bed communicating directly with the zone of chlorination, feeding more of said material to the first bed thereby causing said material to flow into the second of said beds and from there into the zone of chlorination by flow from the upper level of the second bed, maintaining the gas pressure in the second bed above the pressure of the chlorination zone, and withdrawing the inert fluidizing gas of the first bed from the system.

2. The method of claim 1 wherein the fluidizing gas which is inert to the material is air.

3. The method of claim 1 wherein the pressure in the second bed is maintained high enough to prevent effluent gases formed in the chlorination zone from penetrating the feed system.

4. In the chlorination of metal bearing materials in a bed in a zone of chlorination, the improvement which comprises feeding pulverulent material to be subjected to chlorination into said bed by establishing a pair of fluidized beds of said material suspended in an upwardly flowing stream of gas which is inert to the material, said beds having separate upper levels and being in communication below the upper levels, the upper level of the first of said beds forming a surface bounded on one side by the fluidized bed and on the other side by the fluidizing gas, the upper level of the second of said beds communicating directly with the zone of chlorination, feeding said material into the first of said beds thereby maintaining the level of said first bed above that of the second bed whereby the material moves from the first bed into the second bed and then into the reaction zone by flow from the upper level of the second bed, withdrawing the fluidizing gas of the first bed from the feed system, flowing the fluidizing gas from the second bed into the reaction zone, and maintaining the pressure in the second bed high enough to prevent effluent gases formed in the chlorination zone from penetrating the feed system.

5. In the chlorination of metal bearing materials in a bed in a zone of chlorination, the improvement which comprises feeding pulverulent material to be subjected to chlorination into a fluidized bed of said material by establishing a pair of fluidized beds of said material suspended in an upwardly rising stream of gas which is inert to the material, said beds having separate upper levels and being in communication below the upper levels, the upper level of the first of said beds forming a separate surface bounded on one side by the fluidized bed and on the other side by the fluidizing gas, the upper level of the second of said beds communicating directly with the zone of chlorination, feeding said material into the first of said beds thereby maintaining the level of said first bed above that of the second bed whereby the material moves from the first bed into the second bed and then into the reaction zone by overflow from the upper level of the second bed, the fluidizing gas from the first bed being withdrawn from the feed system and that from the second bed flowing into the reaction zone, maintaining the pressure in said second bed high enough to prevent effluent gases formed in the chlorination zone from penetrating the feed system, and allowing for periodic back-flow of the pulverulent material in the feeding system occasioned by sharp increases in the back-pressure created by effluent gases emanating from the system by feeding the material at a point sufficiently above the level of the surface of the first bed so that the occasional back-flow of pulverulent material does not interrupt the continuous introduction of feed into the feeding system.

References Cited in the file of this patent
UNITED STATES PATENTS

| 2,316,814 | Schemm | Apr. 20, 1943 |
| 2,701,179 | McKinney | Feb. 1, 1955 |
| 2,726,137 | Davis | Dec. 6, 1955 |
| 2,777,755 | Eberhardt | Jan. 15, 1957 |

FOREIGN PATENTS

| 656,374 | Great Britain | Aug. 22, 1951 |
| 1,087,426 | France | Aug. 25, 1954 |